United States Patent
Togashi

(10) Patent No.: US 11,102,368 B2
(45) Date of Patent: Aug. 24, 2021

(54) IMAGE FORMING APPARATUS

(71) Applicant: CANON KABUSHIKI KAISHA, Tokyo (JP)

(72) Inventor: Kazunori Togashi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/095,646

(22) Filed: Nov. 11, 2020

(65) Prior Publication Data

US 2021/0160395 A1 May 27, 2021

(30) Foreign Application Priority Data

Nov. 21, 2019 (JP) .............................. JP2019-210869
Sep. 10, 2020 (JP) .............................. JP2020-152245

(51) Int. Cl.
*H04N 1/00* (2006.01)
*H04N 1/32* (2006.01)
*H04N 1/41* (2006.01)

(52) U.S. Cl.
CPC ..... *H04N 1/00931* (2013.01); *H04N 1/00798* (2013.01); *H04N 1/32443* (2013.01); *H04N 1/32582* (2013.01); *H04N 1/32587* (2013.01); *H04N 1/32598* (2013.01); *H04N 1/41* (2013.01); *H04N 2201/0094* (2013.01)

(58) Field of Classification Search
None
See application file for complete search history.

(56) References Cited

U.S. PATENT DOCUMENTS

2002/0018232 A1   2/2002   Takaira et al.
2003/0151759 A1*  8/2003   Suzuki ..................... H04N 1/41
                                                        358/1.13

\* cited by examiner

*Primary Examiner* — Lennin R Rodriguezgonzalez
(74) *Attorney, Agent, or Firm* — Canon U.S.A., Inc. IP Division

(57) ABSTRACT

An apparatus includes a forming unit, a receiving unit configured to receive an instruction, a reading unit configured to read an image based on the instruction, a memory configured to store a plurality of pieces of pixel data, a first output unit configured to output the plurality of pieces of pixel data at an output cycle, a data bus configured to transfer the pixel data, and a controller configured to operate a first process and a second process. The forming unit forms an image based on the plurality of pieces of pixel data transferred via the data bus. In a case where the receiving unit receives the instruction, the controller sets the output cycle as a first cycle if the controller is not operating the second process, or sets the output cycle as a second cycle longer than the first cycle if the controller is operating the second process.

8 Claims, 6 Drawing Sheets

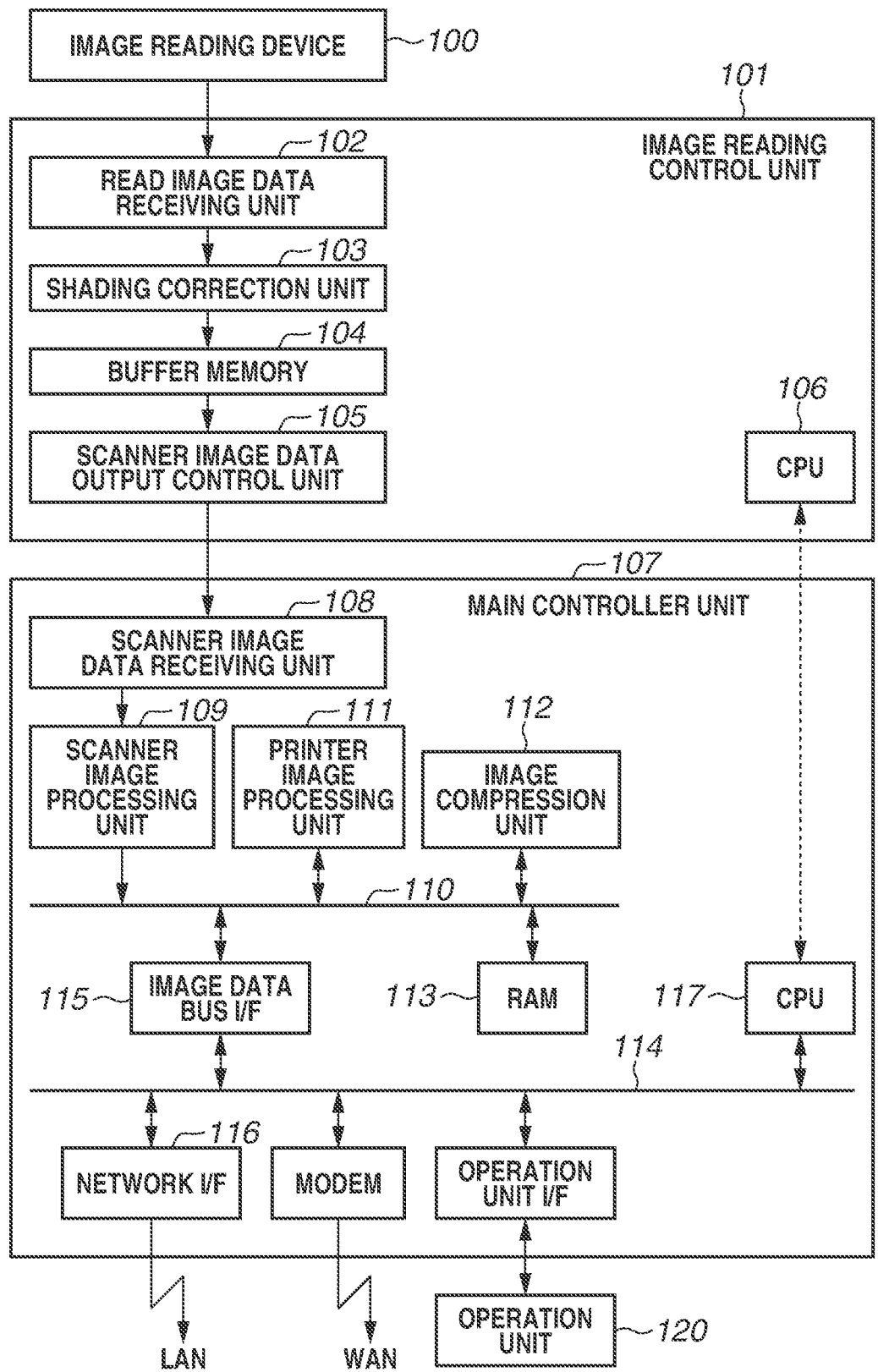

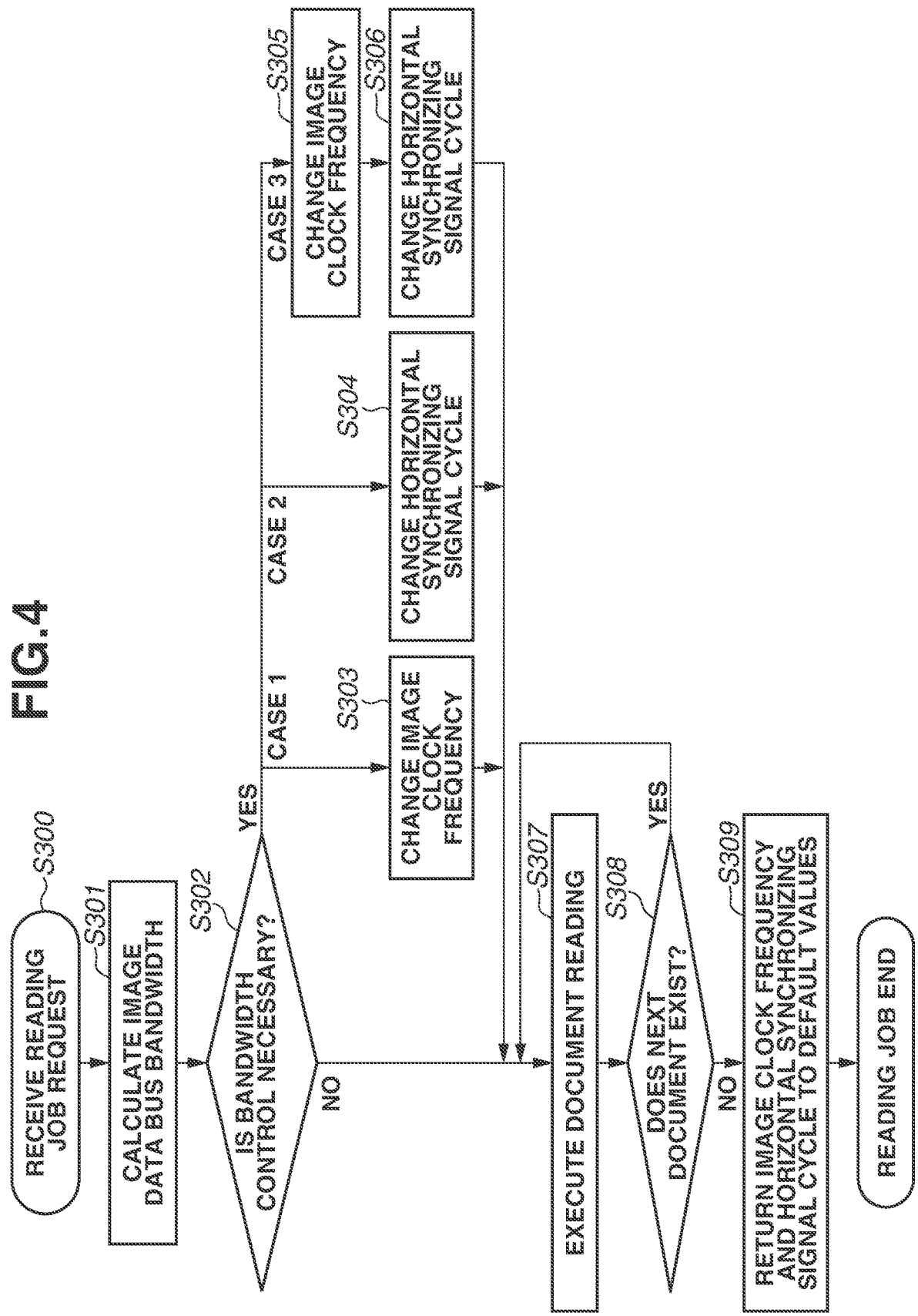

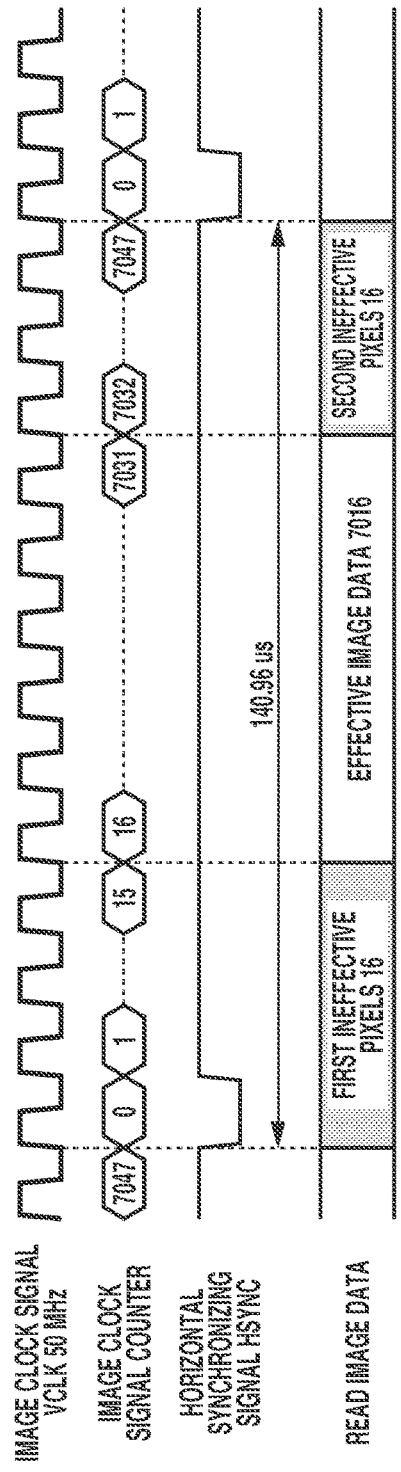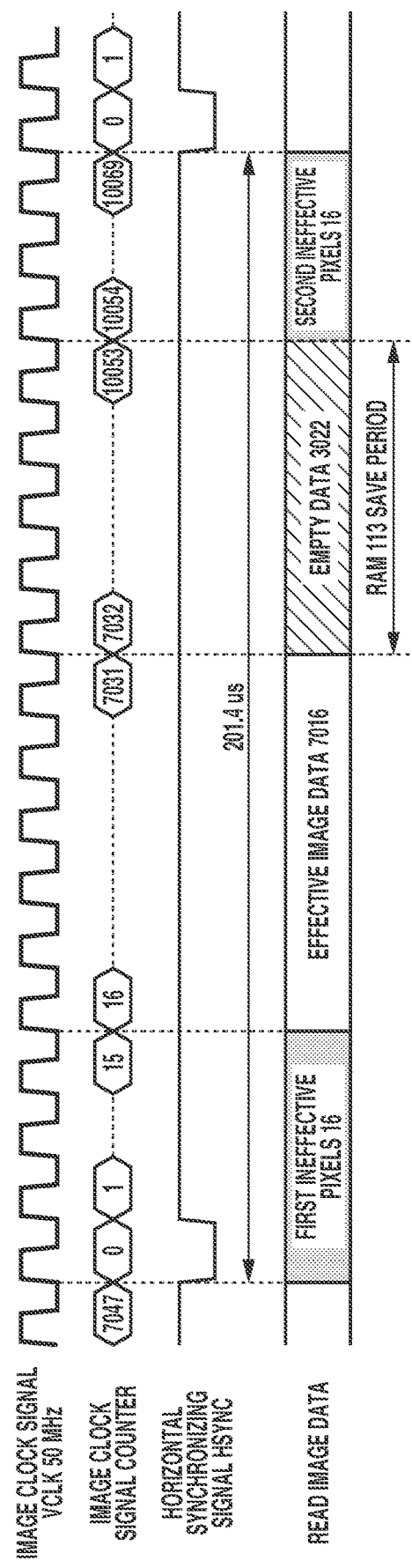

IMAGE FORMING APPARATUS

BACKGROUND OF THE DISCLOSURE

Field of the Disclosure

The aspect of the embodiments relates to an image forming apparatus that forms an image onto a recording medium based on an image read by an image reading device that reads an image on a document.

Description of the Related Art

A multifunction peripheral and a multifunction printer handle various types of image data such as image data read by an image reading device that reads an image on a document, image data for printing that has been converted from read image data, image data to be transmitted to an external device, and image data rasterized based on page-description language (PDL) data transmitted from a personal computer (PC).

United States Patent Application Publication No. 2002/0018232 discusses a configuration in which these types of image data are transferred to various image processing units of an apparatus via a common image data bus, subjected to processing, and then, transferred to an external device or a printer.

United States Patent Application Publication No. 2002/0018232 discusses alternately transferring image data obtained by an image reading device and image data for printing on the common image data bus, line by line. United States Patent Application Publication No. 2002/0018232 discusses that such a configuration enables an operation of transferring image data obtained by the image reading device, to an external computer, and a printing operation of transferring image data for printing from an external device to a printer, to be simultaneously executed using the common image data bus.

Nevertheless, in United States Patent Application Publication No. 2002/0018232, the amount of image data in the image data bus may reach the upper limit of the bandwidth of the image data bus. In such a situation, a processing speed becomes unable to keep up with a required speed, resulting in a malfunction of the apparatus such as an error occurrence or an apparatus stop.

SUMMARY OF THE DISCLOSURE

According to an aspect of the disclosure, an apparatus includes a forming unit configured to form an image onto a recording medium, a receiving unit configured to receive an instruction to start reading of a document, a reading unit configured to read an image on the document based on the received instruction, a memory configured to store a plurality of pieces of pixel data corresponding to a reading result of the reading unit, the read image being represented by a plurality of pixels, each of the plurality of pieces of pixel data being data per pixel, a first output unit configured to output the stored plurality of pieces of pixel data, a data bus configured to transfer the plurality of pieces of pixel data, and a controller configured to operate a first process of transferring the plurality of pieces of pixel data output from the first output unit, to the forming unit via the data bus, and a second process of converting data input from an external device of the apparatus, into a plurality of pieces of pixel data for forming an image onto the recording medium, and transferring the converted plurality of pieces of pixel data to the forming unit via the data bus. The forming unit forms an image onto the recording medium based on the plurality of pieces of pixel data transferred via the data bus. The controller sets an output cycle at which the first output unit outputs the plurality of pieces of pixel data corresponding to the read image based on the instruction as a first cycle in a case where the receiving unit receives the instruction while the controller is not operating the second process. The controller sets the output cycle as a second cycle longer than the first cycle in a case where the receiving unit receives the instruction while the controller is operating the second process. The first output unit outputs the plurality of pieces of pixel data at the set output cycle.

Further features of the disclosure will become apparent from the following description of exemplary embodiments with reference to the attached drawings.

BRIEF DESCRIPTION OF THE DRAWINGS

FIGS. 2A and 2B are block diagrams according to the first exemplary embodiment.

FIG. 4 is a flowchart illustrating a control procedure according to the first exemplary embodiment.

FIGS. 5A and 5B are time charts each illustrating a horizontal synchronizing signal HSYNC cycle and a pixel configuration of read image data.

DESCRIPTION OF THE EMBODIMENTS

Hereinafter, exemplary embodiments of the disclosure will be described with reference to the drawings. The shapes and relative disposition of the components described in the exemplary embodiments are to be appropriately changed depending on various conditions and the configuration of an apparatus to which the disclosure is applied. The shapes and relative disposition are not intended to limit the scope of the disclosure to those described in the following exemplary embodiments.

Figure 1:
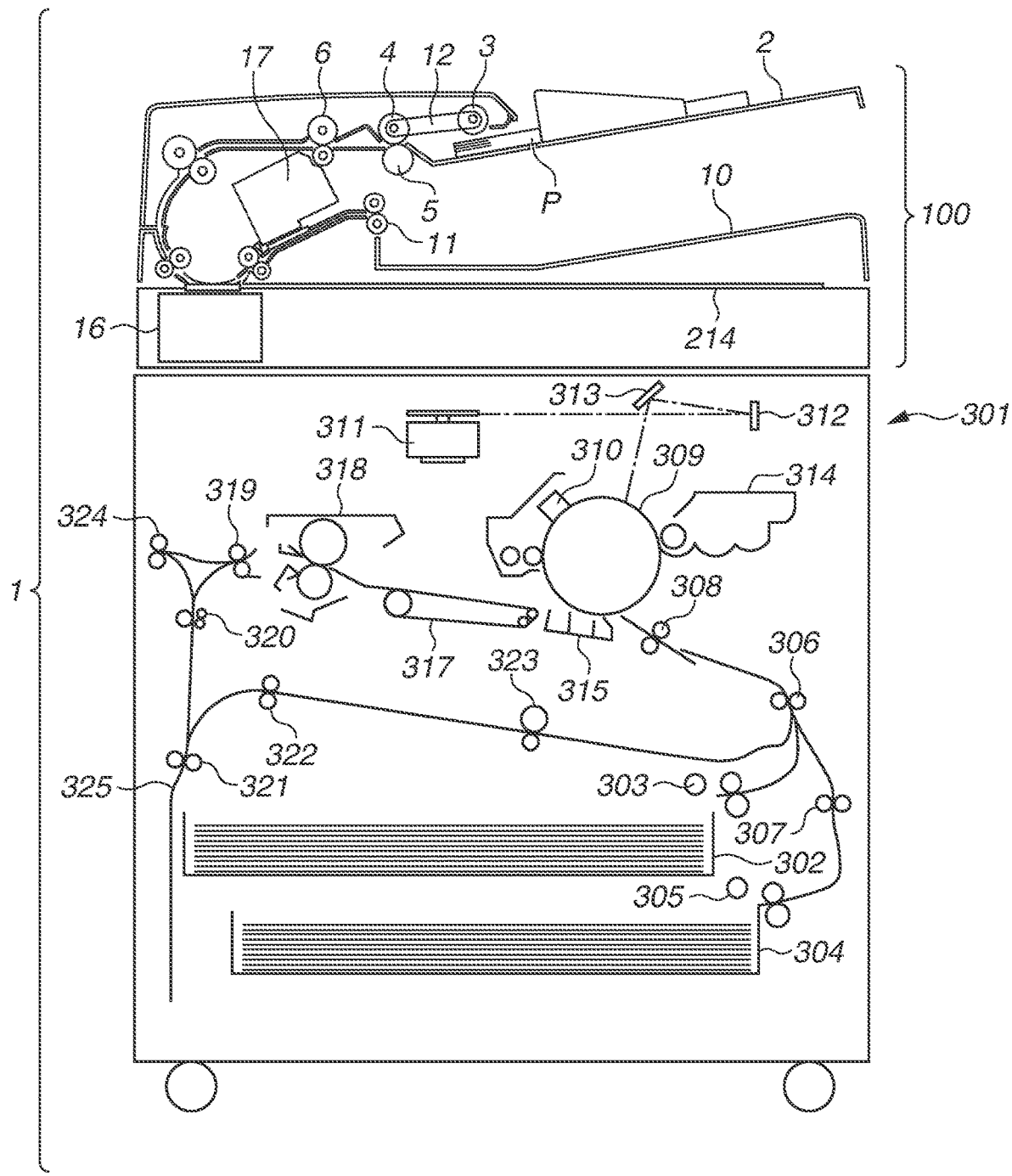
FIG. 1 is a cross-sectional view of an image forming apparatus according to a first exemplary embodiment.

FIG. 1 is a cross-sectional view illustrating a configuration of a monochrome electrophotographic multifunction peripheral (hereinafter, referred to as an image forming apparatus) 1 used in a first exemplary embodiment. The image forming apparatus 1 may be a facsimile machine, a printing machine, or a printer. In addition, a recording method is not limited to the electrophotographic method, and may be, for example, an inkjet method. Furthermore, the image forming apparatus 1 may be either a monochrome image forming apparatus or a color image forming apparatus.

Hereinafter, the configuration and functions of the image forming apparatus 1 will be described with reference to FIG. 1. As illustrated in FIG. 1, the image forming apparatus 1 includes an image reading device (document reading device) 100 and an image printing device 301.

A document P stacked on a document stack portion 2 is separated into individual sheets and each fed by a pickup roller 3, and then, further conveyed by a feed roller 4 downstream. A separation roller 5 pressed against the feed roller 4 is provided at a position opposing the feed roller 4. The separation roller 5 is configured to rotate when a load torque larger than or equal to a predetermined torque is applied to the separation roller 5. The separation roller 5 has a function of separating multi fed sheets of the document P.

The pickup roller 3 and the feed roller 4 are coupled by a swing arm 12. The swing arm 12 is supported by a rotating shaft of the feed roller 4 so that the swing arm 12 is rotatable about the rotating shaft of the feed roller 4.

The individual sheets of the document P each are conveyed by the feed roller 4 and various conveyance rollers such as a conveyance roller 6, and discharged by a discharge roller 11 onto a discharge tray 10.

Pieces of pixel data representing the image read by a document reading unit 16 that reads an image on one surface of a conveyed document P sheet are output to an image reading control unit 101 to be described below. The image read by the document reading unit 16 is represented by a plurality of pixels, and each of the plurality of pieces of pixel data is data per pixel. Hereinafter, pixel data will also be referred to as image data.

In addition, the image data representing the image read by a document reading unit 17 that read the image on the other surface of the conveyed document P sheet is output to the image reading control unit 101 similarly to the method described for the document reading unit 16.

Thus, document reading is performed.

Reading modes for a document include a first reading mode and a second reading mode. The first reading mode is a mode of reading the image on a document sheet conveyed by the above-described method. The second reading mode is a mode of reading the image on a document placed on a document glass 214 (transparent member), by the document reading unit 16 moving at a constant speed. Typically, the image on a sheet-type document is read in the first reading mode, and an image on a bound document such as books or booklets is read in the second reading mode.

Sheet storage trays 302 and 304 are provided in the image printing device 301. Different types of recording media can be stored in the respective sheet storage trays 302 and 304. For example, A4-sized plain paper is stored in the sheet storage tray 302, and A4-sized thick paper is stored in the sheet storage tray 304. The recording media are media on which images are to be formed by the image forming apparatus 1. The recording media include a sheet, a resin sheet, a cloth, an overhead projector (OHP) sheet, and a label.

A pickup roller 303 feeds out a recording medium stored in the sheet storage tray 302, and a conveyance roller 306 conveys it to a registration roller 308. In addition, a pickup roller 305 feeds out a recording medium stored in the sheet storage tray 304, and conveyance rollers 307 and 306 convey it to the registration roller 308.

An image signal output from the image reading device 100 is input to an optical scanning device 311 including a semiconductor laser device and a polygonal mirror. On the other hand, the outer circumferential surface of a photosensitive drum 309 is charged by a charging device 310. After the outer circumferential surface of the photosensitive drum 309 is charged, the laser beams corresponding to the image signals input from the image reading device 100 to the optical scanning device 311 are emitted from the optical scanning device 311 onto the outer circumferential surface of the photosensitive drum 309 via the polygonal mirror and mirrors 312 and 313. This forms an electrostatic latent image on the outer circumferential surface of the photosensitive drum 309.

Subsequently, the electrostatic latent image is developed with toner in a developing device 314, forming the toner image on the outer circumferential surface of the photosensitive drum 309. The toner image formed on the photosensitive drum 309 is transferred onto the recording medium by a transfer charging device 315 provided at a position opposing the photosensitive drum 309 (transfer position). The registration roller 308 feeds the recording medium to the transfer position in synchronization with a transfer timing at which the image is transferred onto the recording medium by the transfer charging device 315.

In the above-described manner, the recording medium having the transferred toner image thereon is fed to a fixing device 318 by a conveyance belt 317, and heated and pressed by the fixing device 318, whereby the toner image is fixed onto the recording medium.

When image formation is performed in a one-sided printing mode, the recording medium having passed through the fixing unit 318 is discharged to a discharge tray (not illustrated) by discharge rollers 319 and 324. When an image formation is performed in a two-sided printing mode, after the fixing processing is performed by the fixing unit 318 on one surface of the recording medium, the recording medium is conveyed to a reversing path 325 by a discharge roller 319, a conveyance roller 320, and a reversing roller 321. After that, the recording medium is conveyed by conveyance rollers 322 and 323 again to the registration roller 308, and an image is formed on the other surface of the recording medium by the above-described method. After that, the recording medium is discharged to the discharge tray (not illustrated) by the discharge rollers 319 and 324.

Figure 2B:
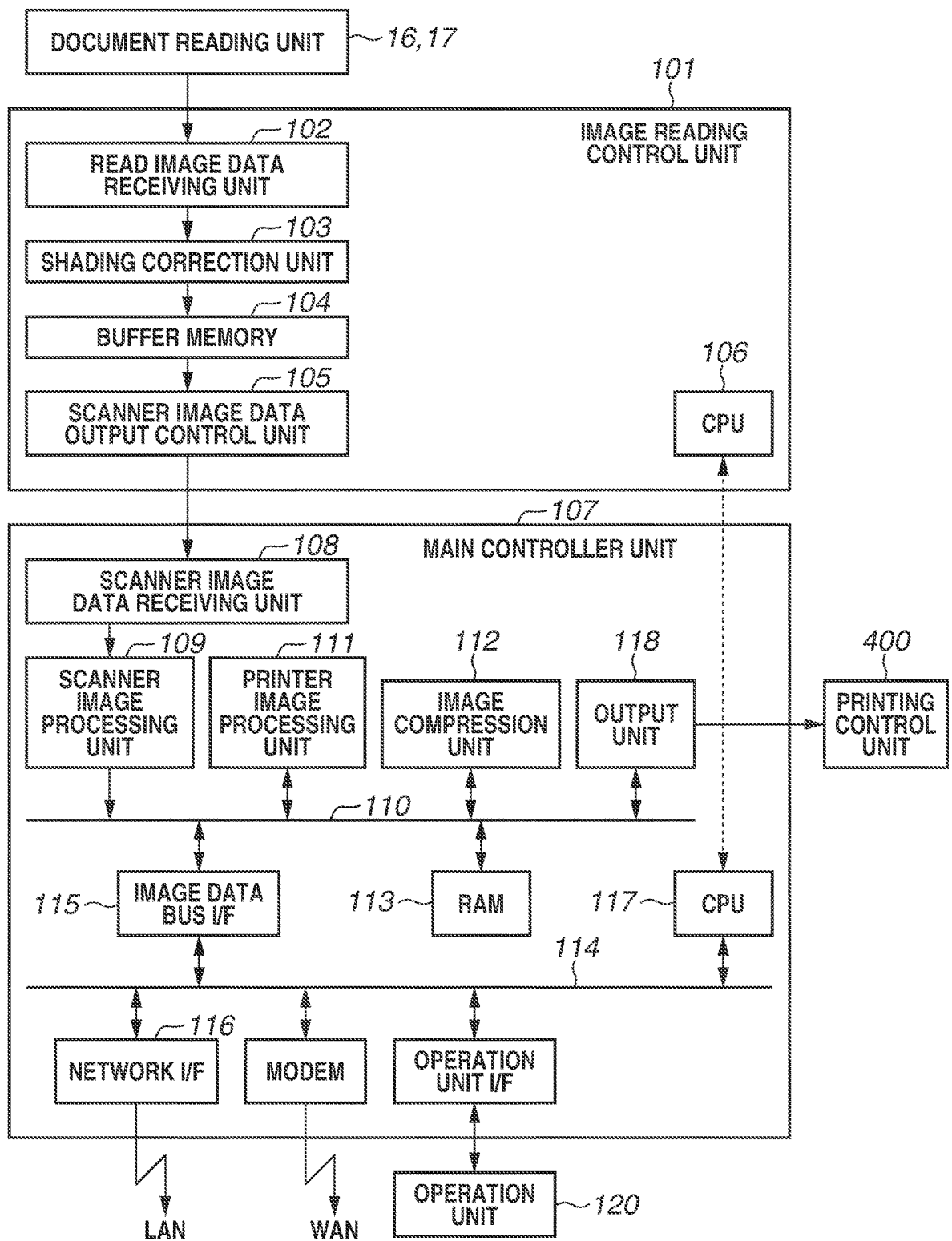

FIGS. 2A and 2B are block diagrams illustrating the image forming apparatus 1 according to the present exemplary embodiment. The image reading control unit 101 and a main controller unit 107 each include at least one application specific integrated circuit (ASIC), and execute the functions to be described below.

The image reading control unit 101, which is provided in the image reading device 100, processes image data transmitted from the document reading unit 16 or 17 and controls the image reading device 100. A read image data receiving unit 102 receives the image data output from the document reading unit 16 or 17. A shading correction unit 103 performs shading correction on the image data.

A buffer memory 104 stores the image data having been subjected to shading correction. A scanner image data output control unit 105 controls the output of the image data to the main controller unit 107. The scanner image data output control unit 105 reads out and outputs the image data stored in the buffer memory 104 line by line. A data rate (frequency) of image data to be read out from the buffer memory 104 can be set to any value, and the number of pixels included in image data on one line can also be set to any value. The buffer memory 104 may be a page memory that stores read image data corresponding to a plurality of pages, or may be a line memory that stores image data corresponding to a plurality of lines.

A central processing unit (CPU) 106 controls components of the image reading device 100 and the image reading control unit 101.

The main controller unit 107 processes the image data received from the image reading control unit 101 and page-description language (PDL) data received from the outside. A scanner image data receiving unit 108 receives the image data output by the scanner image data output control unit 105. A scanner image processing unit 109 performs processing on the image data received by the scanner image data receiving unit 108, such as color conversion processing in order for the image printing device 301 to perform image formation (printing) corresponding to the image data. An image data bus 110 is a data bus that can transfer image data, is connected to various control units, and serves as a bus that exchanges image data in the entire apparatus.

The image data processed by the scanner image processing unit 109 is transmitted via an output unit 118 to a printing control unit 400 that controls the image printing device 301. The printing control unit 400 is provided in the image printing device 301. The main controller unit 107 may be provided in the image reading device 100 or may be provided in the image printing device 301.

A printer image processing unit 111 converts PDL data transmitted from an external computer, into bitmap data, and generates image data in order for the image printing device 301 to perform image formation (printing). The generated image data is transmitted via the output unit 118 to the printing control unit 400 that controls the image printing device 301.

An image compression unit 112 compresses the image data transmitted from the scanner image processing unit 109 via the image data bus 110, into a data format such as a Joint Photographic Experts Group (JPEG) format. A random access memory (RAM) 113 functions as a buffer for image data transmitted in the image data bus 110. Image data is taken in or out of the RAM 113. If the amount of image data in the image data bus 110 reaches the upper limit of its bandwidth, part of the image data is temporarily taken into the RAM 113 before the amount reaches the upper limit, resulting in a certain available data bandwidth being maintained, whereby the amount of image data transmitted in the image data bus 110 is reduced.

A system bus 114 is a control bus along which data for controlling the main controller unit 107 is transmitted. An image data bus interface (I/F) 115 is a bus bridge for connecting the system bus 114 and the image data bus 110, and converting a data structure.

A network I/F 116 is a circuit for exchanging data with an external network device such as a local area network (LAN). For example, when a document image read by the image reading device 100 is transmitted to the outside, image data from the scanner image processing unit 109 is transmitted to the image compression unit 112 via the image data bus 110, and compressed into JPEG data. Then, the compressed image data is transmitted from the network I/F 116 to an external device via the image data bus I/F 115 and the system bus 114. The network I/F 116 also receives data from an external device. The received data (PDL) for printing is transmitted in the image data bus 110 via the system bus 114 and the image data bus I/F 115, transmitted to the printer image processing unit 111, and then output to the printing control unit 400. A facsimile modem is also connected to the system bus 114. Furthermore, an operation unit 120 is also connected to the system bus 114 via an operation unit I/F for a user operation.

A CPU 117 controls the entire main controller unit 107. The CPU 117 can communicate with the CPU 106 of the image reading control unit 101, and controls the image reading control unit 101. The CPU 117 sets the following via the CPU 106 of the image reading control unit 101: an image clock signal VCLK frequency based on a frequency (cycle) at which the scanner image data output control unit 105 outputs image data, and a horizontal synchronizing signal HSYNC cycle for image data. The scanner image data output control unit 105 outputs the image data in synchronization with the image clock signal VCLK frequency.

Figure 3:
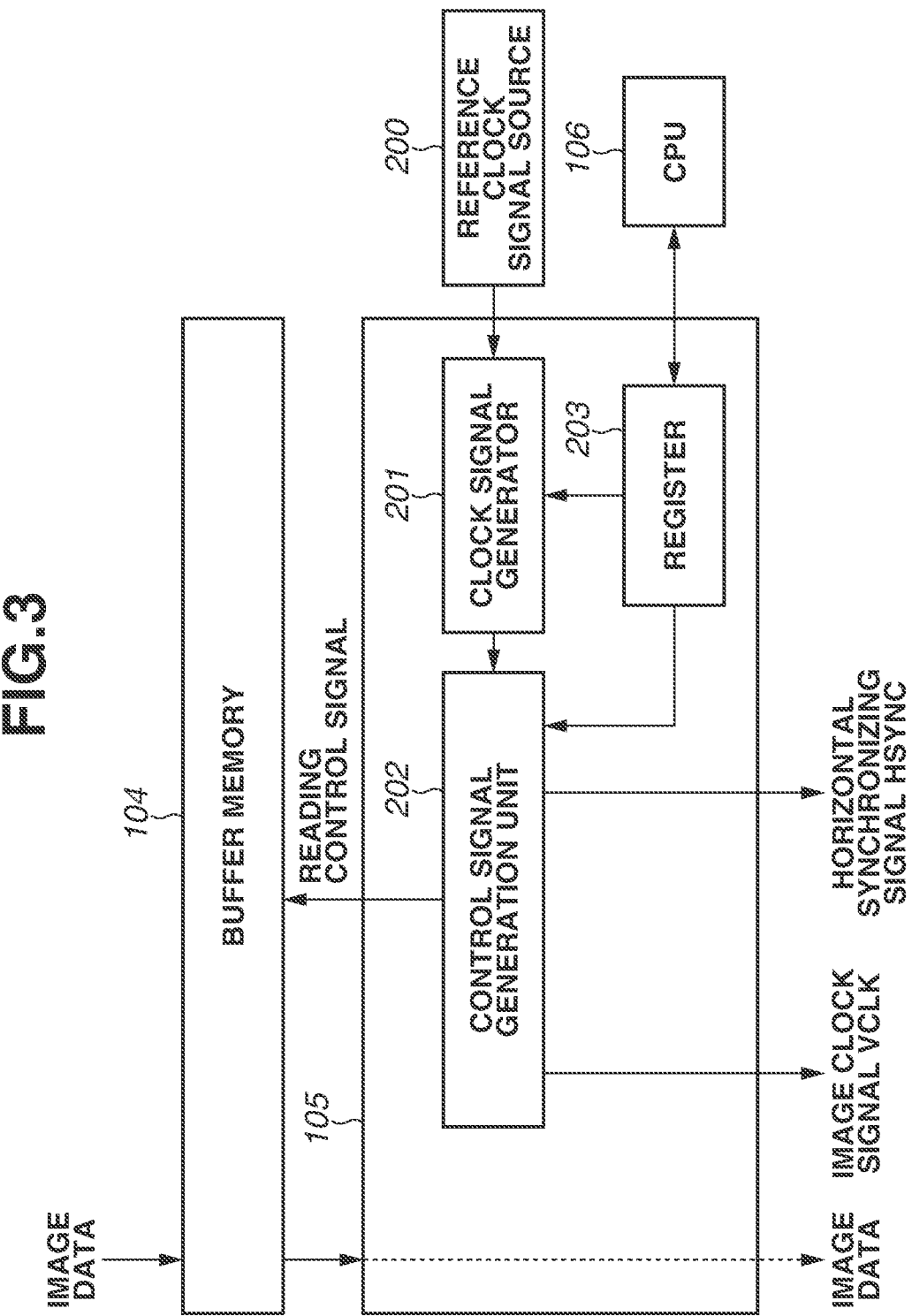
FIG. 3 is a block diagram related to an image data output control unit.

FIG. 3 is a block diagram illustrating the details of the scanner image data output control unit 105.

The scanner image data output control unit 105 includes a clock signal generator 201 and a control signal generation unit 202. A reference clock signal source 200 is, for example, a crystal oscillator, and generates a reference clock signal. The clock signal generator 201 incorporates a frequency synthesizer circuit that uses a phase-locked loop (PLL), and can generate a clock signal with an optional frequency based on a reference clock signal.

Using a clock signal generated by the clock signal generator 201, the control signal generation unit 202 generates an image clock signal VCLK and a readout control signal for controlling a timing at which image data stored in the buffer memory 104 is read out. Thus, an image clock signal VCLK frequency and a readout timing of image data from the buffer memory 104 can be controlled by the frequency of a clock signal generated by the clock signal generator 201 being changed.

The control signal generation unit 202 also generates a horizontal synchronizing signal HSYNC to be output to the scanner image data receiving unit 108. The control signal generation unit 202 includes a counter circuit (not illustrated) operating at the same clock frequency as that of the image clock signal VCLK. The setting of a count value serving as a basis for a horizontal synchronizing signal HSYNC cycle, in the counter circuit, allows the generation of a horizontal synchronizing signal HSYNC with an optional cycle that is synchronized with the image clock signal VCLK. In other words, the number of image clock signals VCLK in one cycle of the horizontal synchronizing signal HSYNC can be changed by a counter value included in the control signal generation unit 202 being changed.

A register 203 stores a setting value of a clock signal frequency generated by the clock signal generator 201, and a setting value (count value) of a horizontal synchronizing signal HSYNC cycle of the control signal generation unit 202. Based on an instruction from the CPU 117, the CPU 106 changes or sets a setting value of the frequency of a clock signal and a setting value of the cycle of a horizontal synchronizing signal HSYNC that are stored in the register 203. The CPU 117 calculates a bandwidth occupying data amount in the image data bus 110, and issues an instruction to change setting values to the CPU 106 based on the calculation result.

FIG. 4 is a flowchart illustrating a control procedure, in which the processing is executed by the CPU 117.

In step S300, the CPU 117 receives a start instruction of a job that uses the image reading device 100, such as copying or image transmission, from a user via the operation unit 120.

In step S301, the CPU 117 calculates a bandwidth occupying data amount in the image data bus 110. More specifically, the CPU 117 calculates the total value of the bandwidth of the image data bus 110 that is to be occupied by an input reading job, and the bandwidth being occupied by a job such as current printing.

In step S302, the CPU 117 determines whether the total value of bandwidth that has been calculated in step S301 exceeds a first predetermined value. If the calculated total value of bandwidth exceeds the first predetermined value (YES in step S302, case 1), the CPU 117 advances the processing to step S303. The first predetermined value is a value smaller than the upper limit of the bandwidth of the image data bus 110.

If the calculated total value of bandwidth does not exceed the first predetermined value (NO in step S302), the CPU 117 advances the processing to step S307. In step S307, the CPU 117 instructs the CPU 106 to execute the reading job. Document reading is thereby executed by the image reading device 100.

In step S303, the CPU 117 performs a first bandwidth occupying data amount reduction.

In step S303, the CPU 117 performs the processing of reducing the frequency of the image clock signal VCLK output by the control signal generation unit 202. The CPU 117 instructs the CPU 106 to reduce the frequency of the image clock signal VCLK. In response to the instruction from the CPU 117, the CPU 106 changes the frequency of the image clock signal VCLK. For example, with a frequency at 42.5 MH switched from a normal frequency at 50 MHz, the image data bandwidth of the image data bus 110 that is occupied by the reading job is reduced by 15%.

If it is determined in step S302 that the total value of bandwidth that has been calculated in step S301 exceeds a second predetermined value larger than the first predetermined value (YES in step S302, case 2), the processing proceeds to step S304. In step S304, the CPU 117 performs a second bandwidth occupying data amount reduction. The second predetermined value is a value smaller than the upper limit of the bandwidth of the image data bus 110.

In step S304, the CPU 117 performs the processing of increasing the cycle of the horizontal synchronizing signal HSYNC. The CPU 117 instructs the CPU 106 to increase the cycle of the horizontal synchronizing signal HSYNC. In response to the instruction from the CPU 117, the CPU 106 changes the value in the register 203 to switch the cycle of the horizontal synchronizing signal HSYNC. For example, a normal count value=7048 and a cycle=140.96 μs as cycle settings are switched to a count value=10070 and a cycle=201.4 μs.

FIG. 5A illustrates a horizontal synchronizing signal cycle, a count value, and a pixel configuration of image data in a normal state. FIG. 5B illustrates a horizontal synchronizing signal cycle, a count value, and a pixel configuration of image data that are obtained after the cycle of the horizontal synchronizing signal HSYNC is switched to a large cycle. FIG. 5A illustrates an example in which the count value within one cycle of the horizontal synchronizing signal HSYNC is 7048. The pixel configuration is made up of in sequence, 16 pixels of ineffective pixel data added from the start timing of the cycle of the horizontal synchronizing signal HSYNC, 7016 pixels (corresponding to the 297-mm longitudinal size of an A4-sized document) of effective image data, and 16 pixels of ineffective pixel data. In the present exemplary embodiment, in the 16-pixel sections of ineffective pixel data, the control signal generation unit 202 outputs the image clock signal VCLK to the scanner image data receiving unit 108 without outputting a readout control signal for reading out image data from the buffer memory 104. As a result, in the 16-pixel sections of image data described as ineffective pixel data, image data is not output to the scanner image data receiving unit 108.

FIG. 5B illustrates an example of a switched cycle of the horizontal synchronizing signal HSYNC where the count value within one cycle of the horizontal synchronizing signal HSYNC is 10070. The pixel configuration illustrated in FIG. 5B is made up of, in sequence, 16 pixels of ineffective pixel data added from the start timing of the cycle of the horizontal, 7016 pixels (corresponding to the 297-mm longitudinal size of an A4-sized document) of effective synchronizing signal HSYNC, 3022 pixels of empty data, and 16 pixels of ineffective pixel data added. The processing in the empty data section is the same as that in the ineffective pixel data sections illustrated in FIG. 5A. That is, in the empty data section, the image clock signal VCLK is output to the scanner image data receiving unit 108 without outputting image data. Thus, in the empty data and ineffective pixel data sections, image data is not transmitted through the image data bus 110.

If it is determined in step S302 that the total value of bandwidth that has been calculated in step S301 exceeds a third predetermined value larger than the second predetermined value (YES in step S302, case 3), the processing proceeds to step S305. In steps S305 and S306, the CPU 117 performs a third bandwidth occupying data amount reduction. In the third bandwidth occupying data amount reduction, the CPU 117 executes both the first bandwidth occupying data amount reduction and the second bandwidth occupying data amount reduction. In step S305, the CPU 117 executes the first bandwidth occupying data amount reduction. Subsequently, in step S306, the CPU 117 executes the second bandwidth occupying data amount reduction. The third predetermined value is a value smaller than the upper limit of the bandwidth of the image data bus 110.

After one of the bandwidth occupying data amount reductions in steps S303 to S306 is executed, the processing proceeds to step S307, in which document reading is started.

In step S308, the CPU 117 determines the existence or non-existence of the next document to be read. If the next document exists (YES in step S308), the processing returns to step S307, and document reading is continued. If the next document does not exist (NO in step S308), the processing proceeds to step S309. In step S309, the CPU 117 returns the frequency of the image clock signal VCLK and the cycle of the horizontal synchronizing signal HSYNC that have been set in the bandwidth occupying data amount reduction, to normal settings. After the CPU 117 returns the setting values to normal settings, a reading job ends.

As described above, in the present exemplary embodiment, in response to a reception of a reading job that uses the image reading device 100, the total value of the bandwidth of the image data bus 110 that is to be occupied by the job, and the bandwidth being occupied by a job such as current printing is calculated. Then, based on the calculated total value, the frequency of the image clock signal VCLK and/or the cycle of the horizontal synchronizing signal HSYNC are changed. This can prevent a data amount in a data bus from reaching the upper limit of its bandwidth.

In addition to a bandwidth occupying data amount reduction, a document conveyance speed of the image reading device 100 may be reduced, or control of widening an interval between documents may be performed.

In the present exemplary embodiment, in response to an instruction from the CPU 117, the frequency of the image clock signal VCLK output by the control signal generation unit 202 and the cycle of the horizontal synchronizing signal HSYNC output by the control signal generation unit 202 are switched between two levels: a level in a normal state and a level in a bandwidth occupying data amount reduction state, but the switching method is not limited to the switching between the two levels. The CPU 117 may notify the CPU 106 of specific numerical values of the frequency of the image clock signal VCLK and the cycle of the horizontal synchronizing signal HSYNC.

In the present exemplary embodiment, the switching of the frequency of the image clock signal VCLK and the cycle of the horizontal synchronizing signal HSYNC is executed for each job of the image reading device 100. Alternatively, the switching may be executed for each page of read image data.

The CPU 117 may have the functions of the CPU 106, or the CPU 106 may have the functions of the CPU 117.

The image printing device 301 and the printing control unit 400 are included in an image forming unit. In addition, the document reading units 16 and 17 are included in an image reading unit.

A reading job that uses the image reading device 100 is included in a first process. Specifically, the first process includes transferring image data output from the scanner image data output control unit 105 to the printing control unit 400 via the image data bus 110.

In addition, a printing job in which the image printing device 301 performs image formation based on PDL data transmitted from an external device is included in a second process. Specifically, the second process includes converting PDL data transmitted from an external device, into bitmap data, generating image data for the image printing device 301 to print, and transferring the generated image data to the printing control unit 400 via the image data bus 110.

A second exemplary embodiment will be described. The description will not be given of the configurations similar to those of the first exemplary embodiment.

In the first exemplary embodiment, the frequency of the image clock signal VCLK and the cycle of the horizontal synchronizing signal HSYNC are changed based on the total value of the bandwidth of the image data bus 110 that is to be occupied by an input reading job, and the bandwidth being occupied by a job such as current printing. In the present exemplary embodiment, the frequency of the image clock signal VCLK is changed depending on whether a printing job is being executed in which the image printing device 301 performs image formation based on PDL data transmitted from an external device when a reading job that uses the image reading device 100 is input. Specifically, when a reading job is input while a printing job is being executed in which the image printing device 301 performs image formation based on PDL data transmitted from an external device, the CPU 117 instructs the CPU 106 to reduce the frequency of the image clock signal VCLK. A reading job is input while a printing job is not being executed in which the image printing device 301 performs image formation based on PDL data transmitted from an external device, the CPU 117 does not switch the frequency of the image clock signal VCLK. In other words, in the present exemplary embodiment, when a reading job is input while a second process is being operated, the CPU 117 instructs the CPU 106 to reduce the frequency of the image clock signal VCLK. When a reading job is input while a second process is not being operated, the CPU 117 does not switch the frequency of the image clock signal VCLK.

As described above, in the present exemplary embodiment, the image clock signal VCLK has a frequency that is changed depending on whether a printing job is being executed in which the image printing device 301 performs image formation based on PDL data transmitted from an external device, when a reading job that uses the image reading device 100 is input. This can prevent a data amount in a data bus from reaching the upper limit of its bandwidth.

The following method may be applied to the exemplary embodiments described above. Specifically, in response to a reception of a reading job while a printing job is being executed with the resolution of an image to be formed set to a first resolution, the CPU 117 instructs the CPU 106 to reduce the frequency of the image clock signal VCLK. In addition, in response to a reception of a reading job while a printing job is being executed with the resolution of an image to be formed set to a second resolution lower than the first resolution, the CPU 117 does not switch the frequency of the image clock signal VCLK. This is because a higher resolution of an image to be formed causes the bandwidth of the image data bus 110 to be more occupied.

In the present exemplary embodiment, the frequency of the image clock signal VCLK is changed, but the configuration is not limited to that. For example, the cycle of the horizontal synchronizing signal HSYNC may be changed.

According to the exemplary embodiments of the disclosure, it is possible to prevent a data amount in a data bus from reaching the upper limit of its bandwidth. While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-210869, filed Nov. 21, 2019, which is hereby incorporated by reference herein in its entirety.

What is claimed is:

1. An apparatus including a forming unit configured to form an image onto a recording medium, the apparatus comprising:
   a receiving unit configured to receive an instruction to start reading of a document;
   a reading unit configured to read an image on the document based on the received instruction;
   a memory configured to store a plurality of pieces of pixel data corresponding to a reading result of the reading unit, the read image being represented by a plurality of pixels, each of the plurality of pieces of pixel data being data per pixel;
   a first output unit configured to output the stored plurality of pieces of pixel data;
   a data bus configured to transfer the plurality of pieces of pixel data; and
   a controller configured to operate a first process of transferring the plurality of pieces of pixel data output from the first output unit, to the forming unit via the data bus, and a second process of converting data input from an external device of the apparatus, into a plurality of pieces of pixel data for forming an image onto the recording medium, and transferring the converted plurality of pieces of pixel data to the forming unit via the data bus,
   wherein the forming unit forms an image onto the recording medium based on the plurality of pieces of pixel data transferred via the data bus,
   wherein the controller sets an output cycle at which the first output unit outputs the plurality of pieces of pixel data corresponding to the read image based on the instruction as a first cycle in a case where the receiving unit receives the instruction while the controller is not operating the second process, and
   wherein the controller sets the output cycle as a second cycle longer than the first cycle in a case where the receiving unit receives the instruction while the controller is operating the second process, the first output unit outputting the plurality of pieces of pixel data at the set output cycle.

2. The apparatus according to claim 1, further comprising a generator configured to generate a clock signal,
   wherein the first output unit outputs the plurality of pieces of pixel data in synchronization with the clock signal, and
   wherein the controller sets the output cycle as the first cycle by setting a cycle of the clock signal as the first cycle in a case where the receiving unit receives the instruction while the controller is not operating the second process, and the controller sets the output cycle as the second cycle by setting the cycle of the clock signal as the second cycle in a case where the receiving unit receives the instruction while the controller is operating the second process.

3. The apparatus according to claim 2, further comprising:
a counter configured to count pulses included in the clock signal; and
a second output unit configured to output a predetermined signal in response to a count of the counter reaching a predetermined count,
wherein a cycle at which the predetermined signal is output is longer than the second cycle, and
wherein the first output unit outputs a predetermined number of pieces of pixel data within one cycle of the predetermined signal.

4. The apparatus according to claim 1, wherein the reading unit starts reading of the image on the document after the output cycle is set.

5. An apparatus including a forming unit configured to form an image onto a recording medium, the apparatus comprising:
a receiving unit configured to receive an instruction to start reading of a document;
a reading unit configured to read an image on the document based on the received instruction;
a memory configured to store a plurality of pieces of pixel data corresponding to a reading result of the reading unit, the read image being represented by a plurality of pixels, and each of the plurality of pieces of pixel data being data per pixel;
a first output unit configured to output a synchronizing signal;
a second output unit configured to start output of the stored plurality of pieces of pixel data based on the synchronizing signal, the second output unit outputting a predetermined number of pieces of pixel data within one cycle of the synchronizing signal;
a data bus configured to transfer the plurality of pieces of pixel data; and
a controller configured to operate a first process of transferring the plurality of pieces of pixel data output from the second output unit, to the forming unit via the data bus, and a second process of converting data input from an external device of the apparatus, into a plurality of pieces of pixel data for forming an image onto the recording medium, and transferring the converted plurality of pieces of pixel data to the forming unit via the data bus,
wherein the forming unit forms an image onto the recording medium based on the plurality of pieces of pixel data transferred via the data bus,
wherein the controller sets a cycle at which the synchronizing signal is output as a first cycle in a case where the receiving unit receives the instruction while the controller is not operating the second process, and
wherein the controller sets the cycle at which the synchronizing signal is output as a second cycle longer than the first cycle in a case where the receiving unit receives the instruction while the controller is operating the second process.

6. The apparatus according to claim 5, wherein the second output unit outputs the plurality of pieces pixel data at a predetermined cycle.

7. An apparatus including a forming unit configured to form an image onto a recording medium, the apparatus comprising:
a receiving unit configured to receive an instruction to start reading of a document;
a reading unit configured to read an image on the document based on the received instruction;
a memory configured to store a plurality of pieces of pixel data corresponding to a reading result of the reading unit, the read image being represented by a plurality of pixels, each of the plurality of pieces of pixel data being data per pixel;
a first output unit configured to output the stored plurality of pieces of pixel data;
a data bus configured to transfer the plurality of pieces of pixel data; and
a controller configured to operate a first process of transferring the plurality of pieces of pixel data output from the first output unit, to the forming unit via the data bus, and a second process of converting data input from an external device of the apparatus, into a plurality of pieces of pixel data for forming an image onto the recording medium, and transferring the converted plurality of pieces of pixel data to the forming unit via the data bus,
wherein the forming unit forms an image onto the recording medium based on the plurality of pieces of pixel data transferred via the data bus,
wherein, in a case where the receiving unit receives the instruction while the controller is not operating the second process, the controller sets an output cycle at which the first output unit outputs the plurality of pieces of pixel data corresponding to the read image based on the instruction as a first cycle in a case where a resolution of the image to be formed by the forming unit is a first resolution, and
wherein, in a case where the receiving unit receives the instruction while the controller is operating the second process, the controller sets the output cycle as a second cycle longer than the first cycle in a case where the resolution of the image to be formed by the forming unit is a second resolution higher than the first resolution.

8. An apparatus including a forming unit configured to form an image onto a recording medium, the apparatus comprising:
a receiving unit configured to receive an instruction to start reading of a document;
a reading unit configured to read an image on the document based on the received instruction;
a memory configured to store a plurality of pieces of pixel data corresponding to a reading result of the reading unit, the read image being represented by a plurality of pixels, each of the plurality of pieces of pixel data being data per pixel;
a first output unit configured to output a synchronizing signal;
a second output unit configured to start output of the stored plurality of pieces of pixel data based on the synchronizing signal, the second output unit outputting a predetermined number of pieces of pixel data within one cycle of the synchronizing signal;
a data bus configured to transfer the plurality of pieces of pixel data; and
a controller configured to operate a first process of transferring the plurality of pieces of pixel data output from the second output unit, to the forming unit via the data bus, and a second process of converting data input from an external device of the forming apparatus, into a plurality of pieces of pixel data for forming an image onto the recording medium, and transferring the converted plurality of pieces of pixel data to the forming unit via the data bus, wherein the forming unit forms an image onto the recording medium based on the plurality of pieces of pixel data transferred via the data bus, wherein, in a case where the receiving unit receives the instruction while the controller is not operating the second process, the controller sets a cycle at which the synchronizing signal is output as a first cycle in a case where a resolution of the image to be formed by the forming unit is a first resolution, and wherein, in a case where the receiving unit receives the instruction while the controller is operating the second process, the controller sets the cycle at which the synchronizing signal is output as a second cycle longer than the first cycle in a case where the resolution of the image to be formed by the forming unit is a second resolution higher than the first resolution.

* * * * *